US009311821B2

(12) United States Patent
Melum et al.

(10) Patent No.: US 9,311,821 B2
(45) Date of Patent: Apr. 12, 2016

(54) TECHNIQUES FOR REPORTING ON OR TRACKING GROUND VEHICLES

(71) Applicant: ADS-B Technologies, LLC, Anchorage, AK (US)

(72) Inventors: Michael Steven Melum, Anchorage, AK (US); Robert C. Nelson, Anchorage, AK (US)

(73) Assignee: ADS-B Technologies, LLC, Anchorage, AK (US)

( * ) Notice: Subject to any disclaimer, the term of this patent is extended or adjusted under 35 U.S.C. 154(b) by 27 days.

(21) Appl. No.: 14/132,714

(22) Filed: Dec. 18, 2013

(65) Prior Publication Data

US 2014/0163857 A1 Jun. 12, 2014

Related U.S. Application Data

(63) Continuation of application No. 13/104,906, filed on May 10, 2011, now Pat. No. 8,634,827, which is a continuation-in-part of application No. 12/698,135, filed on Feb. 1, 2010, now Pat. No. 8,442,518.

(51) Int. Cl.
*H04B 7/185* (2006.01)
*G08G 9/00* (2006.01)
*H04W 4/00* (2009.01)
(Continued)

(52) U.S. Cl.
CPC ............. *G08G 9/00* (2013.01); *H04B 7/18506* (2013.01); *H04B 7/18508* (2013.01); *H04L 69/08* (2013.01); *H04W 4/001* (2013.01); *H04W 4/02* (2013.01); *H04W 4/021* (2013.01); *H04W 4/028* (2013.01); *H04W 4/20* (2013.01); *G01S 2013/466* (2013.01); *G01S 2013/468* (2013.01); *H04W 88/06* (2013.01)

(58) Field of Classification Search
CPC ...................... H04B 7/18508; G01S 2205/001
USPC ................. 455/66.1, 456.1, 456.3, 457, 3.01, 455/67.11, 569.1, 550.1, 414.2; 342/30, 40
See application file for complete search history.

(56) References Cited

U.S. PATENT DOCUMENTS 6,151,308 A 11/2000 Ibanez-Meier
7,639,844 B2 12/2009 Haddad
(Continued)

FOREIGN PATENT DOCUMENTS

EP 1826913 8/2007
WO WO2007/059560 5/2007
(Continued)

OTHER PUBLICATIONS

EP11737412: Rule 161 and 162 claim amendments, mailed Jan. 16, 2013, 9 pages.
(Continued)

*Primary Examiner* — John J Lee
(74) *Attorney, Agent, or Firm* — Berkeley Law & Technology Group, LLP (57) ABSTRACT

Ground vehicle reporting and tracking techniques are provided to track vehicles associated with a particular area (e.g., an airport, a military base, etc.). Ground vehicles may regularly report information about the vehicle to one or more control stations via corresponding communication links. The communication links may include, for example, an Automatic Dependent Surveillance-Broadcast (ADS-B) link and a non-ADS-B link.

33 Claims, 4 Drawing Sheets

(51) Int. Cl.
*H04W 4/02* (2009.01)
*H04W 4/20* (2009.01)
*H04L 29/06* (2006.01)
*H04W 88/06* (2009.01)
*G01S 13/46* (2006.01)

(56) References Cited

U.S. PATENT DOCUMENTS

| | | | |
|---|---|---|---|
| 8,442,518 | B2 | 5/2013 | Ilarregui |
| 8,634,827 | B2 | 1/2014 | Melum |
| 2003/0008611 | A1 | 1/2003 | Forman et al. |
| 2004/0032367 | A1 | 2/2004 | Smith et al. |
| 2008/0106457 | A1 | 5/2008 | Bartolini et al. |
| 2009/0310530 | A1 | 12/2009 | Cerra et al. |
| 2010/0085236 | A1* | 4/2010 | Franceschini et al. .......... 342/30 |
| 2011/0163908 | A1* | 7/2011 | Andersson et al. ............. 342/36 |
| 2012/0214420 | A1* | 8/2012 | O'Connor et al. ........... 455/66.1 |

FOREIGN PATENT DOCUMENTS

| | | |
|---|---|---|
| WO | WO2007/064252 | 6/2007 |
| WO | WO/2011/094021 | 8/2011 |

OTHER PUBLICATIONS

EP11737412: Supplemental Search report, mailed Feb. 13, 2014, 7 pages.
US Department of Transportation Federal Aviation Administration, "Draft Advisory Circular, Vehicle ADS-B Squitter Equipment," Jun. 11, 2010, pp. 1-10.
US Department of Transportation Federal Aviation Administration, "Vehicle Automatic Dependent Surveillance-Broadcast (ADS-B) Specification," Jan. 31, 2011, pp. 1-34.
U.S. Appl. No. 12/698,135, filed Feb. 1, 2010, 44 Pages.
U.S. Appl. No. 12/698,135: Notice to File Missing Parts, filed Mar. 5, 2010, 5 Pages.
U.S. Appl. No. 12/698,135: Applicant Response to Pre-Exam, Mailed May 5, 2010, 17 Pages.
U.S. Appl. No. 12/698,135: Filing Receipt, filed May 14, 2010, 3 Pages.
U.S. Appl. No. 12/698,135: Any Document Coming from L and R, Mailed May 21, 2010, 4 Pages.
U.S. Appl. No. 12/698,135: Any Request Going to L and R, Mailed Jul. 1, 2010, 6 Pages.
U.S. Appl. No. 12/698,135: Preliminary Amendment, Mailed Jul. 19, 2010, 4 Pages.
U.S. Appl. No. 12/698,135: Any Document Coming from L and R, Mailed Aug. 14, 2010, 3 Pages.
U.S. Appl. No. 12/698,135: Notice of New or Revised Publication Date, Mailed Aug. 19, 2010, 1 Page.
U.S. Appl. No. 12/698,135: Notice of Publication, Mailed Aug. 4, 2011, 1 Page.
U.S. Appl. No. 12/698,135: Non-Final Rejection, Mailed Jun. 20, 2012, 14 Pages.
U.S. Appl. No. 12/698,135: Reconsideration After Non-Final Reject, Mailed Sep. 12, 2012, 14 Pages.
U.S. Appl. No. 12/698,135: Notice of Allowance, Mailed Sep. 27, 2012, 11 Pages.
U.S. Appl. No. 12/698,135: Filing Receipt, Mailed Nov. 6, 2012, 3 Pages.
U.S. Appl. No. 12/698,135: And Document Coming from L and R, Mailed Nov. 8, 2012, 1 Page.
U.S. Appl. No. 12/698,135: Issue Fee Payment, Mailed Dec. 19, 2012, 1 page.
U.S. Appl. No. 12/698,135: Issue Notification, Mailed Apr. 24, 2013, 1 Page.
U.S. Appl. No. 13/725,310, filed Dec. 21, 2012, 47 Pages.
U.S. Appl. No. 13/725,310: Notice to File Missing Parts, filed Feb. 5, 2013, 2 Pages.
U.S. Appl. No. 13/725,310: Applicant Response, Mailed Apr. 10, 2013, 14 Pages.
U.S. Appl. No. 13/725,310: Notice of New or Revised Publication Date, Mailed Dec. 12, 2013, 1 Page.
U.S. Appl. No. 13/104,906, filed May 10, 2011, 34 Pages.
U.S. Appl. No. 13/104,906: Notice to File Missing Parts, filed May 31, 2011, 2 Pages.
U.S. Appl. No. 13/104,906: Applicant Response to Pre-Exam Formalities, Mailed Jul. 22, 2011, 6 Pages.
U.S. Appl. No. 13/104,906: Filing Receipt, Mailed Jul. 29, 2011, 3 Pages.
U.S. Appl. No. 13/104,906: Notice of Publication, Mailed Nov. 10, 2011, 1 Page.
U.S. Appl. No. 13/104,906: Non-Final rejection, Mailed Apr. 23, 2013, 14 Pages.
U.S. Appl. No. 13/104,906: Reconsideration-After Non-Final Reject, Mailed Aug. 22, 2013, 11 Pages.
U.S. Appl. No. 13/104,906: Notice of Allowance and Fees Due, Mailed Sep. 16, 2013, 9 Pages.
U.S. Appl. No. 13/104,906: Issue Fee Payment, Mailed Dec. 16, 2013, 5 Pages.
U.S. Appl. No. 13/104,906: Issue Notification, mailed Dec. 31, 2013, 1 Page.
PCT/US2011/000170: Application as filed on Feb. 1, 2010, 29 pages.
PCT/US2011/000170: International search report, mailed Apr. 1, 2011, 2 pages.
PCT/US2011/000170: Written Opinion of the International Search Authority, mailed Apr. 1, 2011, 5 pages.
PCT/US2011/000170: International preliminary report on patentability, mailed Aug. 7, 2012, 6 pages.
U.S. Appl. No. 13/725,310: Notice of Publication, mailed Mar. 20, 2014, 1 page.
U.S. Appl. No. 13/725,310: Non-Final Rejection, mailed Mar. 6, 2015, 12 pages.
U.S. Appl. No. 13/725,310: Amendment/Req. Reconsideration-After Non-Final Rejection, filed Jul. 6, 2015, 13 pages.

\* cited by examiner

TECHNIQUES FOR REPORTING ON OR TRACKING GROUND VEHICLES

CLAIM OF PRIORITY

This application is a continuation of U.S. application Ser. No. 13/104,906, titled "TECHNIQUES FOR REPORTING ON OR TRACKING GROUND VEHICLES" filed May 10, 2011, which is a continuation-in-part of U.S. patent application Ser. No. 12/698,135, titled "AUGMENTED AIRCRAFT COMMUNICATION SYSTEM" to Carlos Maria Ilarregui, et al. filed on Feb. 1, 2010, both of which are hereby incorporated by reference in their entirety and are assigned to the assignee of the currently claimed subject matter.

BACKGROUND

1. Field

Subject matter disclosed herein relates to techniques for reporting on or tracking vehicles associated with a particular area. In some implementations, reporting and tracking techniques are provided for ground vehicles in an airport environment implementing Automatic Dependent Surveillance-Broadcast (ADS-B) technology.

2. Information

It may be desirable to have current information regarding ground vehicles that are within and/or near a particular area. One type of area in which information may be desirable comprises an airport. For example, security concerns or airport operational issues may make it beneficial to know what type of vehicles may currently be in an airport, where vehicles may be located, how fast they may be moving, what direction they may be moving, who may own the vehicles, and/or other information. Techniques are needed for accurately tracking vehicles within a specific region.

BRIEF DESCRIPTION OF THE FIGURES

Non-limiting and non-exhaustive implementations will be described with reference to the following figures, wherein like reference numerals refer to like parts throughout the various figures unless otherwise specified.

DETAILED DESCRIPTION

Reference throughout this specification to "one embodiment," "an embodiment," "certain embodiments," or "various embodiments" means that a particular feature, structure, or characteristic described in connection with a described embodiment may be included in at least one embodiment of claimed subject matter. Thus, appearances of the phrase "in one example embodiment," "in an example embodiment," "in certain example embodiments," or "in various example embodiments" in various places throughout this specification are not necessarily all referring to the same embodiment(s). Furthermore, particular features, structures, or characteristics may be combined in one or more embodiments.

In certain types of areas, it may be desirable to know what vehicles may currently be within an area. In an airport, for example, many different types of vehicles may be present within boundaries of the airport at any one time. For any number of reasons (e.g., security, logistics, business concerns, etc.), one or more parties associated with an airport may want to keep track of identity or location of vehicles currently within the airport. The present disclosure relates to techniques that may be used to track vehicles associated with a particular area. Although described below in the context of an airport, it should be appreciated that inventive features may also be utilized in other settings (e.g., military bases, etc.).

Figure 1:
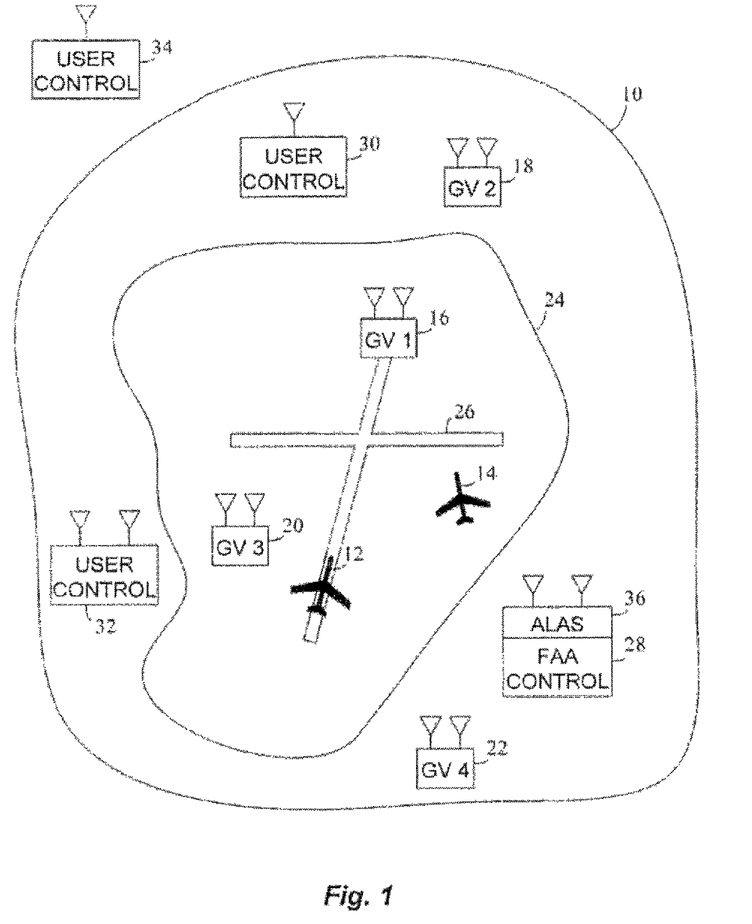
FIG. 1 is a diagram illustrating an example airport in accordance with an embodiment.

FIG. 1 is a diagram illustrating an example airport 10 in accordance with an embodiment. As shown, at a particular point in time, a number of aircraft 12, 14 and a number of ground vehicles (GV 1, GV 2, GV 3, GV 4) 16, 18, 20, 22 may be present within the boundaries of the airport 10. While a few aircraft 12, 14 and ground vehicles 16, 18, 20 are shown in FIG. 1 to simplify illustration, it should be appreciated that more may exist within an airport and the claimed subject matter is not limited in this regard. Ground vehicles 16, 18, 20, 22 may include, for example, one or more of: baggage vehicles, security vehicles, emergency vehicles, tow tractors, pushback tractors, aircraft refuelers, tank trucks, mobile gangways, mobile boarding ramps, airport busses, passenger vehicles, maintenance vehicles, de-icing vehicles, belt loaders, catering vehicles, lavatory service vehicles, container loaders, container transporters, water trucks, air starter vehicles, or any others. Airport 10 may have a movement area 24 within its boundaries where security may be viewed as a higher concern than other areas. The movement area 24 may include a region where runways or taxiways 26 are situated. In some jurisdictions, a "movement area" of an airport may include a ramp (or skirt) region of an airport, while in other jurisdictions it may not.

Automatic Dependent Surveillance-Broadcast (ADS-B) refers to a surveillance system for tracking aircraft for use in, for example, air traffic control or other aviation-type functions. In this context, an aircraft equipped with an ADS-B transmitter (or "ADS-B Out" functionality) may broadcast position information or other information that may be received by ground stations or other aircraft that have ADS-B receivers (or "ADS-B In" functionality). ADS-B broadcasts may be made repeatedly during operation of an ADS-B transmitter in some situations. Received ADS-B information may be used by other aircraft or controllers to maintain a reasonably accurate, up-to-date status of an airspace in a particular region. Some countries may have adopted or deployed ADS-B systems to manage airspace (e.g., Australia). The United States or other nations may also be implementing such systems. In the United States, a proposed ADS-B system may specify at least two different link technologies that may be used for ABS-B transmissions: a 1090 megahertz (MHz) Extended Squitter (1090 ES) and a 978 MHz Universal Access Transceiver (978 MHz UAT).

Referring back to FIG. 1, airport 10 may include an ADS-B control station 28 which may or may not be located at an air traffic control center or control tower of airport 10. ADS-B control station 28 may be managed by, for example, the Federal Aviation Administration (FAA). ADS-B control station 28 may be tasked with, among other things, collecting ADS-B information transmitted by aircraft in or around airport 10 as well as applying a useable format (e.g., ADS-B reports, etc.). Received information may be transferred to, for example, air traffic controllers. As shown in FIG. 1, in some example embodiments, an ADS-B link augmentation system (ALAS) receiver 36 may be coupled to ADS-B control station 28 to support a secondary communication link from aircraft to ADS-B control station 28. While an ADS-B wireless link between an aircraft and ADS-B control station 28 may utilize line-of-sight communication, a secondary link such as ALAS may accommodate non-line-of-sight communication. In at least one implementation, cellular communication may be used as part of an ALAS communication link, although other wireless (e.g., satellite, WiMax, etc.) or wired technologies may be used.

In certain embodiments, ADS-B technology may be used to track ground vehicles associated with an airport in addition to aircraft. For example, in some embodiments, ADS-B control station 28 of FIG. 1 may track locations or identities of ground vehicles associated with airport 10. As stated previously, there are various reasons that airport personnel might want to know an identity or location of ground vehicles currently occupying an airport. Security comprises one possible reason. Airport security personnel might want to know, for example, whether ground vehicles currently in movement area 24 of airport 10 are authorized to be there. Airport logistics may comprise another reason for tracking ground vehicles. For example, if an aircraft is to be refueled, airport personnel may want to know a current location of an available aircraft refueler vehicle. If an aircraft is approaching an airport for landing, airport personnel may want to know a location of a baggage vehicle to handle unloading of baggage from the aircraft after landing. As will be appreciated, other reasons for wanting to know identity or location of ground vehicles in an airport may also exist.

In some embodiments, a ground vehicle associated with an airport may include an ADS-B transmitter (ADS-B Out) to sporadically, periodically, regularly, or continually transmit vehicle information to describe characteristics of the vehicle. In one approach, for example, an ADS-B transmitter may broadcast vehicle information a few seconds apart, although other update approaches including variable timing for an update may be used in other implementations. Vehicle information may include, for example, vehicle position information or vehicle identification information. Vehicle identification information may include, for example, a 24-bit International Civil Aviation Organization (ICAO) identification sequence or some other or additional form of identification. Other (or alternative) types of vehicle information may also be used. For example, in various implementations, one or more of the following may be included in transmitted ADS-B vehicle information: time or date information, ground speed information, heading information, navigation accuracy information, ADS-B version number information, surveillance integrity level information, or other information. An ADS-B transmitter may include, or be coupled to, a position estimator to estimate current position of a vehicle. In one possible approach, a position estimator may comprise a global positioning system (GPS) receiver. Other or additional types of position estimators may be used in other embodiments (e.g., estimators that may use received signal strength, angle of arrival, time of arrival, time difference of arrival, multipath power delay, trilateration, triangulation, time based ranging, and/or other techniques, including combinations of the above).

In addition to airport personnel, one or more other entities may desire information on location or identity of vehicles in an airport. For example, an airport may utilize one or more service provider companies to provide specialized services for an airport. Service provider companies may provide, for example, cargo services, freight services, maintenance services, security services, emergency services, fueling services, catering services, passenger assistance services, ticketing services, hangar services, ground crew services, construction services, or other services, including combinations of services. Service provider companies may desire information on a selected set of vehicles associated with a specialized service or, in some cases, all vehicles currently in an airport (e.g., for a security provider). Individual airlines may also desire information on some or all vehicles currently in an airport. In various embodiments, as illustrated in FIG. 1, entities are permitted to establish user control stations 30, 32, 34 in or around an airport (or similar locale) that are operative for collecting or assembling vehicle information transmitted from vehicles associated with an airport 10. User control stations 30, 32, 34 may also be permitted to collect or assemble aircraft information. User control stations 30, 32, 34 may collect information on vehicles or aircraft associated with a specialized function or criteria or information on all vehicles. For example, a food service company may desire to track catering trucks and aircraft that are served thereby. A security company may desire to track all vehicles within a movement area of an airport. In some implementations, non-ADS-B wireless transmitters within vehicles associated with an airport may be used to transmit vehicle information to user control stations 30, 32, 34. Any of a variety of different non-ADS-B wireless communication technologies may be used. A primary interest of ADS-B control station 28 or an air traffic control center or control tower is vehicle traffic in movement area 24 of airport 10. However, in some implementations, these centers may be provided with IP addresses associated with some or all of the user control stations 30, 32, 34.

Figure 2:
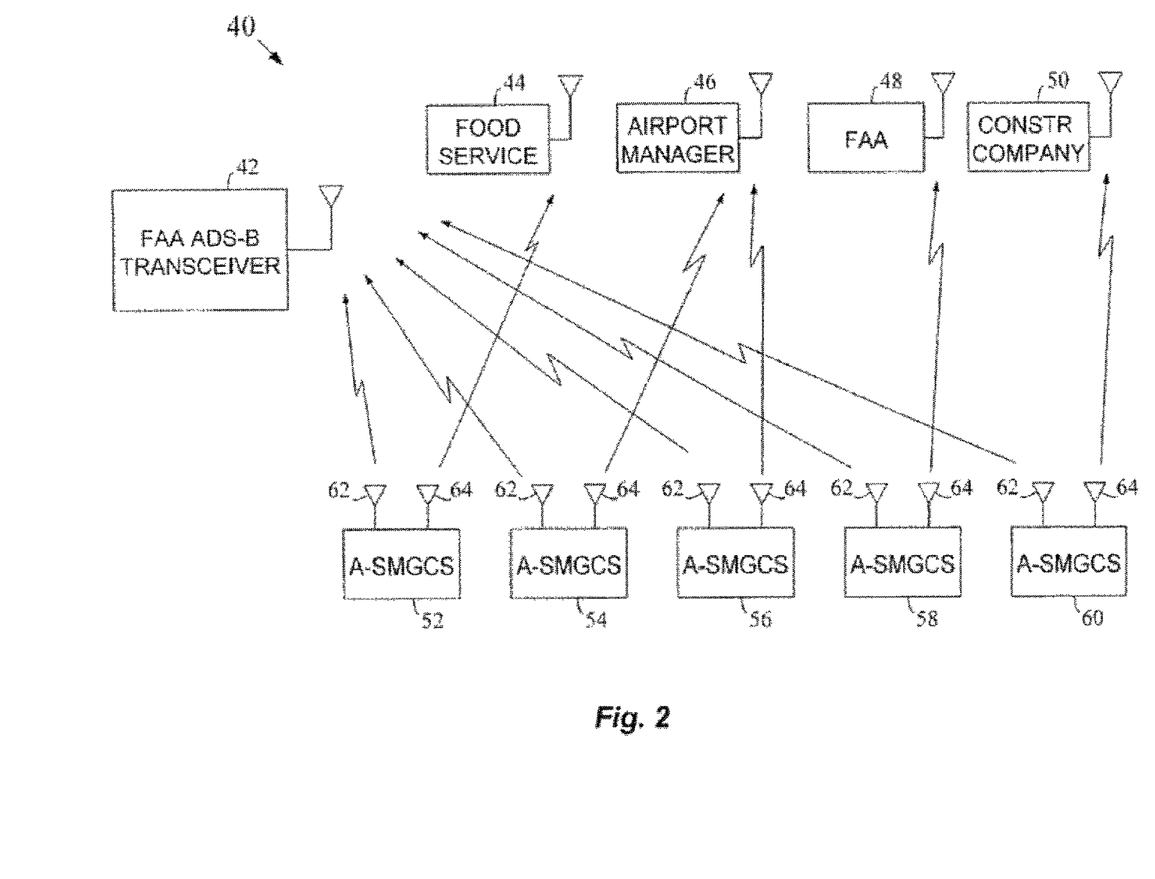
FIG. 2 is a block diagram illustrating an example communication scenario in an airport in accordance with an embodiment.

FIG. 2 is a block diagram illustrating an example communication scenario 40 that may exist within an airport in accordance with an embodiment. As illustrated, an airport may include an FAA-managed ADS-B transceiver 42 at an ADS-B control station. The airport may also include a number of user control stations 44, 46, 48, 50 associated with various entities within the airport. For example, first user control station 44 may be associated with a food service company, second user control station 46 may be associated with an airport manager, third user control station 48 may be associated with the FAA, and fourth user control station 50 may be associated with a construction company. As will be appreciated, many other or alternative user control stations may be used in other implementations. In addition, an airport may include a number of ground vehicles to provide various services therein. Some or all ground vehicles within an airport may include an ADS-B Multi-Link Surface Surveillance (AMLSS) transmitter to perform, among other things, vehicle information reporting functions. Referring to FIG. 2, for example, a first AMLSS transmitter 52 may be located within a catering vehicle, a second AMLSS transmitter 54 may be located within a snow plow, a third AMLSS transmitter 56 may be located within an airport maintenance vehicle, a fourth AMLSS transmitter 58 may be located within an FAA maintenance vehicle, a fifth AMLSS transmitter 60 may be located within a construction vehicle, and so on.

In some embodiments, an AMLSS transmitter 52, 54, 56, 58, 60 may include both an ADS-B wireless transmitter and a non-ADS-B wireless transmitter. AMLSS transmitters 52, 54, 56, 58, 60 may use ADS-B transmitters to transmit vehicle information (via antennas 62 in FIG. 2) to an ADS-B transceiver 42 within an ADS-B control station and a non-ADS-B transmitters to transmit vehicle information (via antennas 64 in FIG. 2) to corresponding user control stations. Thus, a catering vehicle having AMLSS transmitter 52 may transmit vehicle information to a user control station 44 associated with a food service company, a snow plow having AMLSS transmitter 54 may transmit vehicle information to user control station 46 associated with an airport manager, and so on. Although illustrated as a direct wireless link in FIG. 2, it should be appreciated that one or more portions of a link between an AMLSS transmitter and a user control station may be wired.

Figure 3:
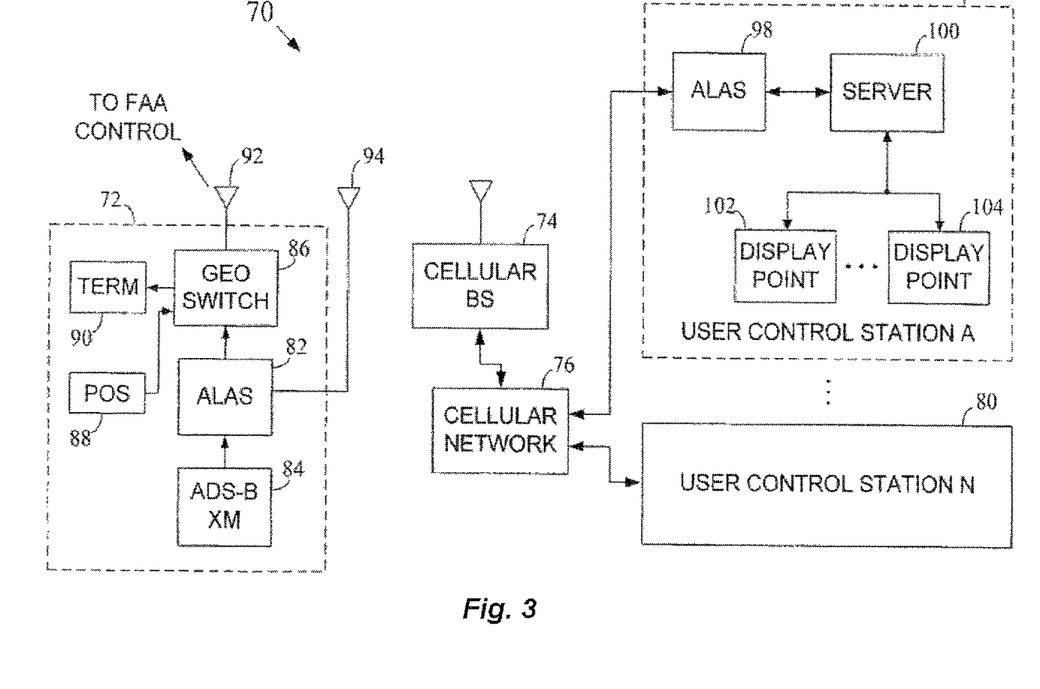
FIG. 3 is a block diagram illustrating an example system arrangement in accordance with an embodiment.

FIG. 3 is a block diagram illustrating an example system arrangement 70 in accordance with an embodiment. System arrangement 70 may occur within, for example, airport 10 of FIG. 1 or in other environments. As shown in FIG. 3, system arrangement 70 may include: an AMLSS transmitter 72 within a ground vehicle, a cellular base station 74 coupled to a cellular network 76, a first user control station 78, and a second user control station 80. As described previously, first and second user control stations 78, 80 may be operative for collecting vehicle information transmitted from ground vehicles (and possibly aircraft) within an airport for use by personnel associated with an entity (e.g., a service provider company, an airline, etc.) that owns or manages user control stations 78, 80. First and second user control stations 78, 80 may each be associated with a different entity within an airport. For example, in one example scenario, first user control station 78 may be associated with a cargo service provider and second user control station 80 may be associated with a security service provider.

AMLSS transmitter 72 may be capable of wirelessly transmitting vehicle information using both an ADS-B protocol and a non-ADS-B protocol. AMLSS transmitter 72 may communicate with user control stations 78, 80 using a non-ADS-B protocol. AMLSS transmitter 72 may communicate with an FAA-managed ADS-B control station using an ADS-B protocol. In the illustrated embodiment, AMLSS transmitter 72 uses cellular communication to communicate with first and second user control stations 78, 80 via cellular base station 74 and cellular network 76. Cellular base station 74 may be located within or near a corresponding airport. In at least one embodiment, cellular network 76 may include digital Internet connectivity for use in communicating with user control stations 78, 80, although the invention is not limited in this regard. Additional or alternative non-ADS-B protocols may be used in other embodiments. A ground vehicle that includes AMLSS transmitter 72 may comprise any type of ground vehicle associated with a particular airport. As will be described in further detail, in various embodiments, location based conditions may be used to enable/disable transmission of ADS-B signals and/or non-ADS-B signals by AMLSS transmitter 72.

As illustrated in FIG. 3, AMLSS transmitter 72 may include an ALAS transmitter 82, an ADS-B transmitter 84, a geographic switch 86, a position estimator 88, and a termination 90. ADS-B transmitter 84 assembles information about a ground vehicle (i.e., vehicle information) and sporadically, periodically, regularly, or continually broadcasts signals including vehicle information into a surrounding environment in accordance with an ADS-B protocol. ALAS transmitter 82 may be operative for sporadically, periodically, regularly, or continually transmitting vehicle information about a ground vehicle using one or more non-ADS-B wireless protocols. Position estimator 88 may be operative for tracking a current position of a vehicle. Geographic switch 86 may be operative for preventing broadcast of ADS-B signals under certain location-based conditions. Geographic switch 86 may prevent broadcast of an ADS-B signal by, for example, directing a signal to termination 90 instead of antenna 92. In at least one implementation, ALAS transmitter 82, ADS-B transmitter 84, and position estimator 88 are housed within a common box or package which may be sold as an individual product. Geographic switch 86 and termination 90 may also be included in a box or package.

ADS-B transmitter 84 may include any type of wireless transmitter that is authorized for use in an ADS-B system. This may include, for example, a 978 MHz UAT transmitter, a 1090 MHz Extended Squitter, a VHF Data Link Mode 4 (VDL-4) transmitter, or any other ADS-B approved transmitter. Different transmitter types may be approved in different jurisdictions. Position estimator 88 may include a GPS receiver or some other form of estimator. In some embodiments, the position estimator 88 may be part of the ADS-B transmitter 84. In the illustrated embodiment, ALAS transmitter 82 may include a cellular transmitter that is capable of communicating in a cellular communication system. Some examples of cellular communication standards that may be supported by ALAS transmitter 82 in a cellular embodiment include, for example, Global System for Mobile Communication (GSM), General Packet Radio Service (GPRS), Universal Mobile Telecommunications System (UMTS), Enhanced Data Rates for GSM Evolution (EDGE), Long Term Evolution (LTE), CDMA2000, High Speed Downlink Packet Access (HSDPA), or others, including combinations of standards. ALAS transmitter 82 may be coupled to an antenna 94 to facilitate wireless communication with cellular base station 74. When vehicle data is to be transmitted to a particular user control station, ALAS transmitter 82 may establish a connection to a user control station through base station 74 and cellular network 76. A link between cellular network 76 and a user control station (e.g., user control station 78) may be wired, wireless, or a combination of wired and wireless. In one example embodiment, an Internet connection is used between cellular network 76 and a user control station.

Referring again to FIG. 3, user control station 78 may include: an ALAS receiver 98, a server 100, and a plurality of display points 102, 104. ALAS receiver 98 may be operative for receiving signals including vehicle information from vehicles or aircraft within an airport. Server 100 may assemble vehicle information received by ALAS receiver 98 into a useable format and transfer this information to display points 102, 104 for display to personnel associated with user control station 78. ALAS receiver 98 may include communication functionality appropriate to support a type of link being used to transmit signals to user control station 78. For example, if an Internet link is being used between cellular network 76 and user control station 78, ALAS receiver 98 may include a modem to support the communication. If a wireless link is used, ALAS receiver 98 may include a wireless receiver. In at least one implementation, ALAS receiver 98 and server 100 are housed within a common box or package which may be sold as an individual product.

In some embodiments, communication technologies other than (or in addition to) cellular communication may be used to transfer vehicle information through an ALAS link between an ALAS transmitter in a vehicle and an ALAS receiver in a user control station. Some communication technologies that may be used include, for example, IEEE 802.16 (WiMAX) wireless networking, satellite communication, point-to-point radio frequency links, secure Internet, and/or others. In one implementation, for example, the ALAS link may use cellular communication as a primary communication type and satellite communication as a backup. In addition, while an initial portion of an ALAS link may be wireless, subsequent portions of the link may utilize a wired medium in some embodiments. An ALAS link may utilize line-of-sight communication or non-line-of-sight communication and may include in its path, for example, one or more wireless relay nodes (stationary or mobile), base stations, ground stations, repeater stations, network access points, satellite links, wired links, Internet links, network gateways, routers, switches, public switched telephone network (PSTN) links, cellular links, or other nodes or links.

In certain scenarios, an ADS-B transmitter may only be permitted to transmit within a specific region. For example, with reference to FIG. 1, in some implementations, ground vehicles 16, 18, 20, 22 (as well as grounded aircraft) may only be permitted to transmit ADS-B signals when located within movement area 24 of airport 10. This limitation may be adopted, for example, to reduce congestion in an ADS-B frequency range or for some other reason. In some jurisdictions, ADS-B standard(s) may impose location based limitations on ADS-B broadcasts. Geographic switch 86 of FIG. 3 represents one technique for handling a location based condition placed on ADS-B transmission. Geographic switch 86 may monitor, for example, position information generated by position estimator 88. When the position information indicates that a ground vehicle is within a movement area of an airport, geographic switch 86 may allow ADS-B signals from ADS-B transmitter 84 to pass through to antenna 92 for transmission. When the position information indicates that a ground vehicle is outside a movement area, on the other hand, geographic switch 86 may route ADS-B signals from ADS-B transmitter 84 to termination 90, thereby preventing transmission. In at least one embodiment, AMLSS transmitter 72 may include a storage medium having a map of movement area 24 of airport 10 stored therein. Geographic switch 86 may compare a current position of a ground vehicle to a stored map to determine whether to permit transmission. In at least one embodiment, map information is stored in a database format within geographic switch 86.

In some implementations, more complex location based conditions may be applied to ADS-B transmissions. For example, in one possible implementation, an ADS-B transmitter may be required to initiate ADS-B broadcasts within a specific time period (e.g., 1 second) after entering a region (e.g., movement area 24). The ADS-B transmitter may also be required to continue broadcasts for a certain minimum time duration (e.g., 15 seconds) after entering a region, regardless of whether or not a vehicle remains within the region for the full duration. Geographic switch 86 may be adapted to apply more complex location based conditions on ADS-B transmission. Other techniques for limiting ADS-B transmission based on current vehicle position may alternatively be used.

As with ADS-B transmission, in certain embodiments, ALAS transmission may have location based limitations or conditions placed thereon. For example, in one approach, with reference to FIG. 1, an ALAS transmitter within a vehicle may be allowed to transmit vehicle information to a user control station when a vehicle is outside movement area 24, but not when it is inside area 24. One or more of user control stations 30, 32, 34 may include, for example, an ADS-B receiver to detect ADS-B transmissions from vehicles inside movement area 24. A user control station may, for example, combine vehicle information received by an ADS-B receiver and vehicle information received by an ALAS receiver to obtain full vehicle information.

In another possible approach, an ALAS transmitter may be allowed to transmit vehicle information to a user control station when a vehicle is inside an outer boundary of an airport, but not when a vehicle is outside an airport. In a similar approach, an ALAS transmitter may be allowed to transmit vehicle information to a user control station when a vehicle is within a certain distance of an airport, but not when a ground vehicle is beyond this distance. As will be appreciated, other alternative location based conditions may be placed on ALAS transmissions in other implementations. In embodiments that place location based conditions on ALAS transmissions, an ALAS transmitter may be configured to apply conditions based on position information generated by a position estimator. Alternatively, another geographic switch or similar functionality may be used to apply location based conditions. In some embodiments, no location based limitations may be placed on ALAS transmissions from a vehicle (i.e., an ALAS transmitter may transmit vehicle information regardless of location).

With reference to FIG. 3, in some embodiments, ALAS transmitter 82 may operate in a "passive" mode with respect to ADS-B transmitter 84. That is, ALAS transmitter 82 may not actively interact with ADS-B transmitter 84 and may only passively sense signals generated by ADS-B transmitter 84. In this manner, a standard ADS-B transmitter 84 may be used in AMLSS transmitter 72 (although in some embodiments, transmitter customization may be used). In a passive embodiment, ALAS transmitter 82 may, for example, couple off a portion of an ADS-B signal generated by ADS-B transmitter 84 (using, for example, a directional coupler) and convert a protocol of the coupled signal to a non-ADS-B protocol (e.g., a cellular protocol) for transmission. ALAS transmitter 82 may include a protocol converter to perform protocol conversions. It should be appreciated that ALAS transmitter 82 does not, in all embodiments, receive vehicle data that is already in an ADS-B transmission format. In some embodiments, for example, a baseband representation of vehicle data may be received by ALAS transmitter 82. ALAS transmitter 82 may convert baseband information to a non-ADS-B communication protocol for transmission.

In some embodiments, the vehicle information that is transmitted by ADS-B transmitter 84 is also transmitted by ALAS transmitter 82 (assuming both transmitters are permitted to transmit in a current location). In other embodiments, a reduced amount of vehicle information may be transmitted by ALAS transmitter 82. In still other embodiments, additional information may be included in ALAS transmissions that is not included in ADS-B broadcasts. This additional information may include, for example, voice communications, alarm functions, vehicle telemetry information, or other information. In some implementations, an entity associated with a particular user control station may be permitted to select types of information that a user control station is to receive. An entity may identify, for example, types of vehicles that are to send information to a user control station. Alternatively, an entity may identify particular vehicles (e.g., by vehicle ID) that are to send information to a user control station. An entity may also be permitted to specify any additional information services that it desires (e.g., voice communication, alarm functions, vehicle telemetry information, etc.).

In at least one implementation, one or more user control stations associated with an airport (e.g., user control station 78 in FIG. 3) may be under FAA control. This user control station may be used, for example, to provide information backup for surface ADS-B. An additional wireless transceiver and antenna may be provided (e.g., between ALAS receiver 98 and server 100) for use in communicating backup information to an ADS-B control station, air traffic control center, or control tower.

Although various structures are described herein as transmitters or receivers, it should be appreciated that a full transceiver having both transmitter and receiver functionality may be used for any of these structures. In addition, although AMLSS transmitter 72 of FIG. 3 is described in the context of a ground vehicle, it should be understood that an AMLSS transmitter may also be used in aircraft or other vehicles.

Figure 4:
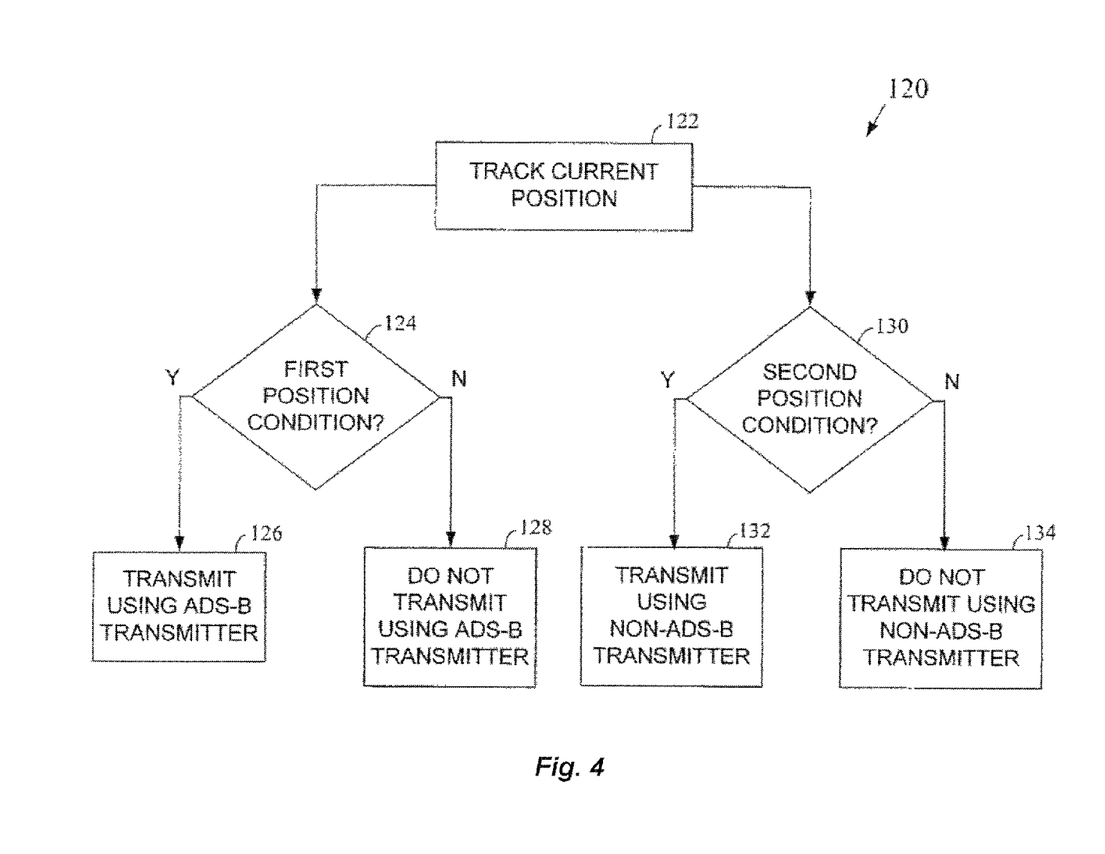
FIG. 4 is a flowchart illustrating an example method for use in a ground vehicle associated with an airport or similar region in accordance with an embodiment.

FIG. 4 is a flowchart illustrating an example method 120 for use in a ground vehicle associated with an airport or similar region in accordance with an embodiment. The ground vehicle may include both an ADS-B transmitter and a non-ADS-B transmitter. A current position of a ground vehicle may be continually tracked (block 122). Based on current position, it may be determined whether a first position related condition exists (block 124). A first position related condition may comprise, for example, a relationship between a current position of a ground vehicle and a first ground region. For example, a first position related condition may comprise a current position of a vehicle being inside a first ground region. Other conditions may alternatively be used. If a first condition is satisfied (block 124-Y), then vehicle information may be broadcast using an ADS-B transmitter (block 126). If a first condition is not satisfied (block 124-N), then vehicle information may not be transmitted using an ADS-B transmitter (block 128).

Based on current position, it may also be determined whether a second position related condition exists (block 130). A second position related condition may also comprise, for example, a relationship between a current position of a vehicle and a first ground region. For example, a second condition may comprise a current position of a vehicle being outside a first region. In another possible implementation, a second condition may comprise a current position of a vehicle being outside a first region or inside a first region but proximate to a boundary thereof. Other conditions may alternatively be used. If a second condition is satisfied (block 130-Y), then vehicle information may be transmitted using a non-ADS-B transmitter (e.g., a cellular transmitter, a WiMax transmitter, a satellite transmitter, etc.) (block 132). If a second condition is not satisfied (block 130-N), then vehicle information may not be transmitted using a non-ADS-B transmitter (block 134). In some embodiments, there may not be a second position related condition and vehicle information may be transmitted by a non-ADS-B transmitter regardless of vehicle location. The transmission of a non-ADS-B transmitter may be directed to, for example, a user control station or similar destination. Method 120 may be repeated sporadically, periodically, regularly, or continually within a ground vehicle in some embodiments.

In some embodiments, a second position related condition may be a relationship between a current position of a vehicle and first and second ground regions. For example, a second condition may comprise a current position of a vehicle being outside a first region but inside a second region. Referring back to FIG. 1, for example, a second condition may comprise a current position of a vehicle being outside movement area 24, but inside an outer boundary of airport 10. In this scenario, ground vehicles that leave airport 10 may not report vehicle information using a non-ADS-B transmitter. In a similar approach, a second condition may comprise a current position of a vehicle being outside movement area 24, but inside or within a certain distance of airport 10. In this embodiment, vehicles that leave airport 10 may report vehicle information using a non-ADS-B transmitter when outside airport 10, but only when near airport 10. In some other embodiments, a second position related condition may be a relationship between a current position of a vehicle and a second ground region, but not a first ground region. For example, a second condition may comprise a current position of a vehicle being within an outer boundary of airport 10. Using this approach, a vehicle may report vehicle information using a non-ADS-B transmitter when in airport 10, regardless of location, but may not report vehicle information using a non-ADS-B transmitter when outside airport 10. Similarly, a second condition may comprise a current position of a vehicle being within airport 10 or within a certain distance of airport 10. In this approach, a ground vehicle may report vehicle information using a non-ADS-B transmitter when in or near airport 10, but may not report vehicle information using a non-ADS-B transmitter when farther from airport 10.

The terms "and," "or," and "and/or" as used herein may include a variety of meanings that also are expected to depend at least in part upon the context in which such terms are used. Typically, "or" is used to associate a list, such as A, B, or C is intended to mean A, B, and C, here used in the inclusive sense, as well as A, B, or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

Methodologies described herein may be implemented by various means depending, at least in part, on applications according to particular features or examples. For example, such methodologies may be implemented in hardware, firmware, or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods or apparatuses that would be known by one of ordinary skill have not been described in detail so as not to obscure claimed subject matter.

Some portions of the preceding detailed description have been presented in terms of logic, algorithms or symbolic representations of operations on binary states stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining," "establishing," "obtaining," "identifying," "selecting," "generating," "initiating," "acquiring" or the like may refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

In at least one implementation, inventive features are embodied as instructions stored on a machine (or computer) readable storage medium. A machine (or computer) readable storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state. A machine-readable (storage) medium may be non-transitory or comprise a non-transitory device.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. An apparatus comprising:
a position estimator to track a current position of a vehicle;
a vehicle Automatic Dependent Surveillance-Broadcast (ADS-B) transmitter to wirelessly transmit vehicle information associated with the vehicle, wherein the vehicle ADS-B transmitter is to disable the transmission of the vehicle information based at least in part on the current position of the vehicle with respect to a surface region; and
an ADS-B link augmentation system (ALAS) transmitter to transmit the vehicle information to a remote user control station via a non-ADS-B communications protocol responsive to an output signal from a geographic switch to monitor the vehicle position with respect to the surface region.

2. The apparatus of claim 1, wherein:
the ALAS transmitter transmits the vehicle information to the remote user control station via cellular communication in response to a presence of a position related condition.

3. The apparatus of claim 2, wherein:
the position related condition to include the current position of the vehicle to be outside the surface region or inside a portion of the surface region proximate to a border thereof.

4. The apparatus of claim 1, wherein:
the vehicle information to include at least vehicle position information and vehicle identification information.

5. The apparatus of claim 1, wherein:
the position estimator to includes a Global Positioning System (GPS) receiver.

6. The apparatus of claim 1, wherein:
the surface region to include a movement area of an airport, wherein the apparatus is to include a memory containing a transmit map of the movement area.

7. The apparatus of claim 1, wherein:
the vehicle ADS-B transmitter to include at least one of a 978 megahertz (MHz) Universal Access Transceiver (UAT) or a 1090 MHz Extended Squitter (1090ES).

8. The apparatus of claim 1, wherein:
the ALAS transmitter to include a coupler to couple a portion of an ADS-B signal generated by the vehicle ADS-B transmitter.

9. The apparatus of claim 1, wherein:
the ALAS transmitter includes a protocol converter to convert a signal from an ADS-B protocol to the non-ADS-B, the non-ADS-B to comprise a cellular protocol.

10. A machine-implemented method comprising:
tracking a current position of a vehicle;
wirelessly transmitting vehicle information from the vehicle using a first transmitter, the vehicle information including characteristics of the vehicle; and
wirelessly broadcasting vehicle information from the vehicle using a second transmitter if the current position of the vehicle satisfies a first condition with respect to a surface region, wherein the second transmitter to include an Automatic Dependent Surveillance-Broadcast (ADS-B) transmitter, and wherein
the wireless transmitting using the first transmitter comprises converting from an ADS-B protocol to a non-ADS-B protocol responsive to an output signal from a geographic switch to monitor the current position of the vehicle with respect to the surface region.

11. The method of claim 10, wherein:
the first transmitter is a non-ADS-B transmitter.

12. The method of claim 10, wherein:
the first transmitter to include a cellular transmitter.

13. The method of claim 10, wherein:
the surface region to include a movement area of an airport.

14. The method of claim 10, wherein:
the first condition to include the current position of the vehicle being within the surface region.

15. The method of claim 10, wherein:
the wirelessly transmitting vehicle information from the vehicle using the first transmitter to include wirelessly transmitting the vehicle information from the vehicle using the first transmitter if the current position of the vehicle satisfies a second condition, the second condition being different from the first condition.

16. The method of claim 15, wherein:
the second condition to include the current position of the vehicle being outside the surface region or inside a portion of the surface region proximate to a border thereof.

17. The method of claim 15, wherein:
the surface region is a first surface region; and
the second condition to include the current position of the vehicle being inside a second surface region, wherein the second surface region encompasses the first surface region.

18. The method of claim 15, wherein:
the surface region is a first surface region; and
the second condition to include the current position of the vehicle being outside the first surface region and inside a second surface region, wherein the second surface region encompasses the first surface region.

19. The method of claim 10, wherein:
the wirelessly transmitting vehicle information from the vehicle using the first transmitter to include wirelessly transmitting vehicle information from the vehicle using the first transmitter regardless of the current position of the vehicle.

20. The method of claim 10, further comprising:
coupling off a portion of an ADS-B signal from the ADS-B transmitter; and
converting the coupled off signal from an ADS-B protocol to a cellular protocol of the first transmitter.

21. The method of claim 10, wherein:
the wirelessly transmitting vehicle information from the vehicle using the first transmitter to include wirelessly transmitting the vehicle information from the vehicle to a remote user control station; and
the wirelessly broadcasting vehicle information from the vehicle using a second transmitter to include transmitting the vehicle information from the vehicle to a remote ADS-B control station.

22. An apparatus comprising:
an ADS-B link augmentation system (ALAS) receiver to receive vehicle information from ALAS transmitters within remote ground vehicles that are not ADS-B transmitters, the ALAS to comprise a protocol converter to convert a signal to a non-ADS-B protocol responsive to an output signal from a geographic switch within one or more of the remote ground vehicles, the geographic switch to monitor the position of the one or more ground vehicles with respect to a surface region; and
a server to collect and assemble the received vehicle information into a useable format for display at one or more display points.

23. The apparatus of claim 22, wherein:
the ALAS receiver to include a cellular receiver to acquire the signals of the non-ADS-B protocol.

24. The apparatus of claim 22, wherein:
the ALAS receiver to include a modem.

25. The apparatus of claim 22, wherein:
the ALAS receiver to include a wireless receiver in accordance with a wireless networking standard.

26. The apparatus of claim 22, wherein:
the ALAS receiver to include a protocol converter to convert a signal received from a remote ALAS transmitter from a protocol used to communicate the signal to the ALAS receiver to a protocol used by an ADS-B receiver.

27. An apparatus comprising: a machine readable storage medium having stored thereon instructions executable by a computing system to:
track a current position of a vehicle;
convert from an Automatic Dependent Surveillance-Broadcast (ADS-B) to a non-ADS-B protocol responsive to an output signal from a geographic switch to monitor the vehicle position with respect to the surface region;
initiate a wireless transmission of vehicle information from the vehicle via the non-ADS-B protocol, the vehicle information to include with characteristics of the vehicle; and
initiate a wireless broadcast of vehicle information from the vehicle via an ADS-B protocol in response to the current position of the vehicle a first condition with respect to a surface region.

28. The apparatus of claim 27, wherein:
the initiation of the wireless transmission of vehicle information via the cellular protocol to include initiation of the wireless transmission of vehicle information via the cellular protocol if the current position of the vehicle is to satisfy a second condition, the second condition to be different from the first condition.

29. The apparatus of claim 28, wherein:
the second condition to include the current position of the vehicle being outside the surface region.

30. The apparatus of claim 29, wherein:
the initiation of the wireless transmission of vehicle information via the cellular protocol to include initiation of the wireless transmission of vehicle information via the cellular protocol regardless of the current position of the vehicle.

31. The apparatus of claim 29, wherein the instructions are further executable to:
acquire a portion of an ADS-B signal to be broadcast from the vehicle; and
convert the acquired signal portion from the ADS-B protocol to the cellular protocol.

32. The apparatus of claim 28, wherein:
the surface region is a first surface region; and
the second condition to include the current position of the vehicle to be inside a second surface region, wherein the second surface region encompasses the first surface region.

33. The apparatus of claim 28, wherein:
the surface region is a first surface region; and
the second condition to include the current position of the vehicle to be outside the first surface region and inside a second surface region, wherein the second surface region encompasses the first surface region.

* * * * *